Sept. 7, 1965　　　　J. R. McGRAW, JR　　　　3,204,725
BRAKE CONTROL APPARATUS
Filed June 22, 1964　　　　　　　　　　2 Sheets-Sheet 1

INVENTOR
Jessie R. McGraw, Jr.

BY
ATTORNEYS

Sept. 7, 1965   J. R. McGRAW, JR   3,204,725
BRAKE CONTROL APPARATUS
Filed June 22, 1964   2 Sheets-Sheet 2

INVENTOR
Jessie R. McGraw, Jr.
BY
ATTORNEYS

United States Patent Office 3,204,725
Patented Sept. 7, 1965

3,204,725
BRAKE CONTROL APPARATUS
Jessie R. McGraw, Jr., 3803 Mt. Washington St., Dallas, Tex.
Filed June 22, 1964, Ser. No. 377,027
7 Claims. (Cl. 188—3)

This invention relates to a brake control apparatus for motor vehicles and more particularly to an apparatus operable by an operator in a towing vehicle for controlling a brake in a vehicle being towed.

This application is a continuation-in-part of my copending application, Serial No. 87,359, filed February 6, 1961, now abandoned.

An object of this invention is to provide a new and improved brake control apparatus operable from a towing vehicle for braking a vehicle being towed thereby which may be powered by the regular storage battery of the towing vehicle.

Another object is to provide a brake control apparatus having a motor carried by the towed vehicle and connected to the brake operating means of the brake system of the towed vehicle by a control means mounted in the towing vehicle.

Still another object is to provide a brake control apparatus having overload release means for limiting the force which can be applied to the brake operating means of the braking system of the towed vehicle to prevent locking of the brakes of the towed vehicle.

A further object is to provide a brake control apparatus for operating the brake system of a towed vehicle whose brake operating means includes a brake pedal, wherein the control apparatus includes an electric motor mounted on the steering column of the towed vehicle and connector means connecting the drive shaft of the motor to the brake pedal for depressing the brake pedal when the motor is energized and having means for retracting the brake pedal when the operation of the motor is discontinued.

A still further object is to provide a brake control apparatus wherein the connector means of the brake control includes an overload release means for limiting the force which can be applied to the brake pedal.

Another object is to provide a brake control apparatus wherein connector means includes a screw rotated by the drive shaft of the motor, a follower nut threadedly mounted on and movable by the screw, and means for connecting the follower nut to the brake pedal for moving the brake pedal upon the rotation of the screw relative to the follower nut, and an overload release means permitting rotation of the follower nut with the screw when the force resisting the movement of the brake pedal exceeds a predetermined limit.

Still another object is to provide a brake control apparatus for a towed vehicle having a hydraulically operated brake system which includes a master cylinder and electrically operable means controllable from the towing vehicle for operating the piston of the master cylinder.

Still another object is to provide a brake control apparatus for a towed vehicle having a hydraulically operated brake system which includes a master cylinder and electrically operable means controllable from the towing vehicle for operating the piston of the master cylinder.

Still another object is to provide a brake control apparatus wherein the electrically operable means includes an electric motor, and a connector means connecting the drive shaft of the motor to the piston of the master cylinder for moving the piston to actuate the brake system of the towed vehicle, the connector means including an overload release means for limiting the force which can be applied to the piston to prevent locking of the brakes of the towed vehicle.

Additional objects and advantages of the invention will be readily apparent from the reading of the following description of a device constructed in accordance with the invention and reference to the accompanying drawings thereof, wherein.

Figure 1:
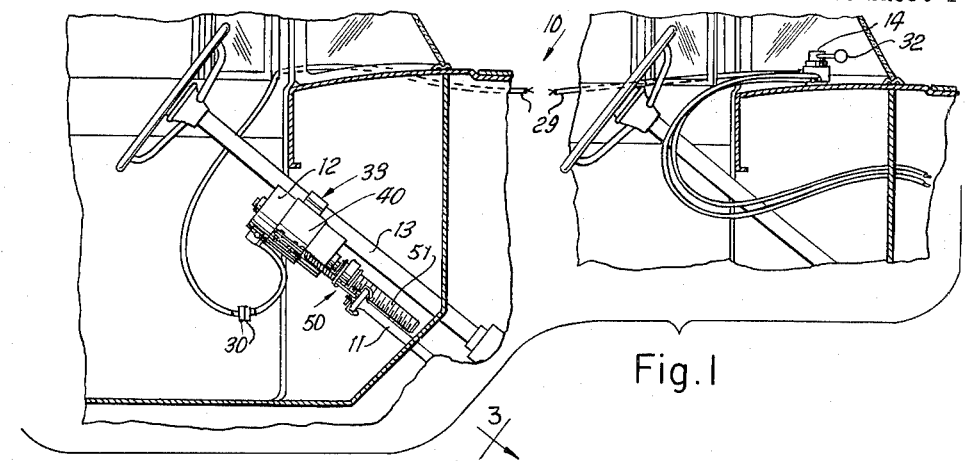
FIGURE 1 is a schematic fragmentary side view of a towing vehicle and a towed vehicle, the vehicles being shown in longitudinal section and provided with a braking control apparatus embodying the invention.
Figures 2, 3:
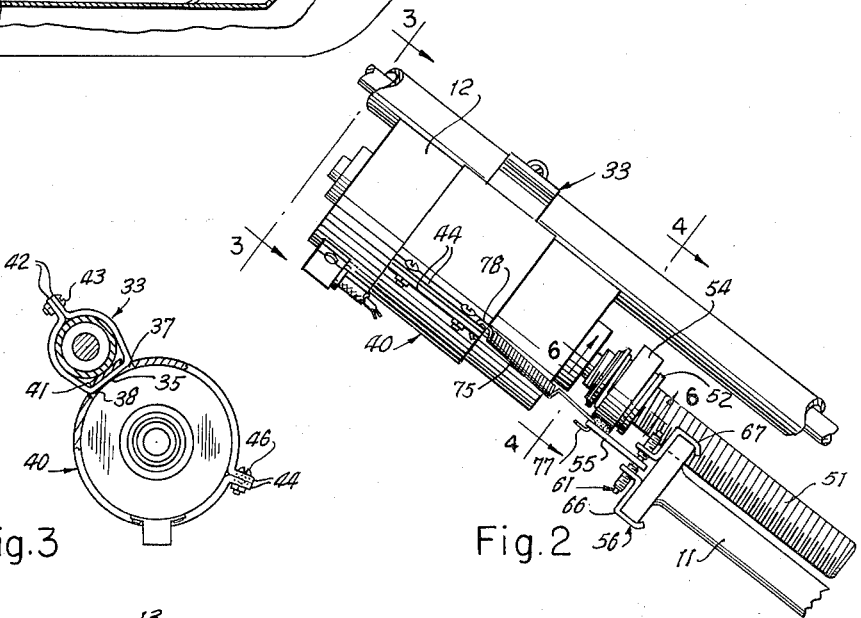
FIGURE 2 is a fragmentary side view of the motor and the connector means connecting the drive shaft of the motor to the brake pedal of the towed vehicle.
FIGURE 3 is a sectional view taken on line 3—3 of FIGURE 2.
Figure 4:
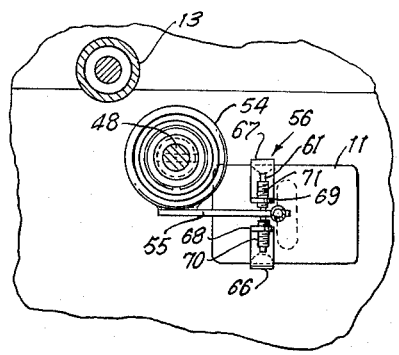
FIGURE 4 is a sectional view taken on line 4—4 of FIGURE 2.

Referring now particularly to FIGURES 1 through 6 of the drawing, the brake control apparatus 10 embodying the invention for controlling the operation of the brake pedal 11 of the towed vehicle A from the towing vehicle B includes a motor 12 mounted on the steering column 13 of the towed vehicle whose operation is controlled by a control device 14. One side of the battery 18 is connected to one side of the motor by the conductor 21, the movable contact 22 of the rheostat resistance 23 when the contact is moved into engagement therewith with the rheostat resistance, the rheostat resistance and a conductor 24. The other side of the battery is connected to the other side of the motor by a conductor 28. The conductors 24 and 28 may be the two insulated conductors of the cable 29 which may extend through a partly open window of the towing vehicle to the towed vehicle and into the interior thereof through a partly open window of the towing vehicle. The cable may have a disconnect plug 30 connected therein.

Figure 5:
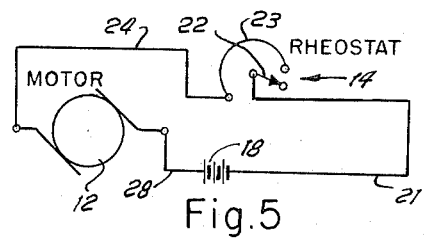
FIGURE 5 is a schematic circuit diagram of the brake control apparatus.
Figure 6:
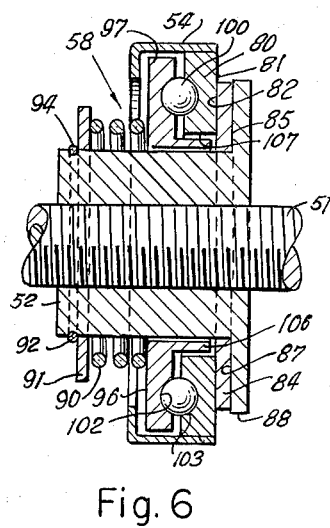
FIGURE 6 is a sectional view taken on line 6—6 of FIGURE 2.

The control device 14 is operable by a usual rotatable pivot arm 32 which when moved in one direction, moves the contact 22 in a counter-clockwise direction from the open position shown in FIGURE 5 to engage the rheostat resistance 23 and as it continues to move in this direction, the effective value of the resistance of the circuit of the motor is decreased.

The motor is rigidly mounted on the steering column 13 by means of a somewhat resilient metal clamp 33 whose intermediate portion 35 extends through a pair of longitudinal slots 37 and 38 of an annular motor clamp or mounting band 40 in order that the elongate strap 41 of the motor mount band 33 be rigidly held by and between the steering column 13 and the intermediate portion 35. The free end portions 42 of the clamp 33 are connected by a bolt 43.

The motor mount band 40 also has a pair of radially outwardly longitudinally extending free end or flange portions 44 which is secured to one another by a bolt 46.

The connector means 50 for connecting the drive shaft 48 of the motor to the brake pedal includes a drive screw 51 rigidly secured to the drive shaft of the motor in any suitable manner, a follower nut 52 threaded on the screw, a non-rotatable ring 54 disposed about the follower nut and connected to the brake pedal by a connector bar 55 and a clamp 56, and an overload release means 58 between the follower nut and the non-rotatable ring. One end of the connector bar is welded to the non-rotatable ring and the screws 61 of the clamp 56 is rotatably mounted thereto at its other end. The pedal clamp includes a pair of clamp bars 66 and 67 which has suitable threaded bores in its straight end portions 68 and 69 in which are engaged the oppositely threaded end portions 70 and 71 of the clamp screw. It will be apparent that when the clamp screw 61 is rotated in one direction the two clamp members are moved away from one another and when rotated in the opposite direction are moved from the brake pedal.

The non-rotatable ring 54 and therefore the brake pedal 11, is biased upwardly by a spring 75 whose lower hook end portion 77 is hooked through a suitable aperture in the upper end of the connector bar 55 and whose opposite hook end portion 78 is hooked through suitable apertures in the flanges 44 of the motor mount band 40.

The non-rotatable ring has a substantially flat bearing ring 80 telescoped in the lower end thereof and rigidly secured thereto whose lower annular surface 81 engages one side surface 82 of a suitable friction ring 84 disposed about the follower nut 52. The other side surface 85 of the friction ring engages the radially outwardly extending annular surface 87 of the external annular flange 88 of the follower nut.

The bearing ring 80, and therefore the non-rotatable ring 54 is biased with a predetermined force toward the follower nut flange by a spring 90 one of whose ends bears against a retainer ring 91 disposed about the follower nut and held against upward movement by a suitable lock ring 92 disposed in an external annular recess 94 of the follower nut. The other end of the spring 90 bears against the upper annular surface 96 of a rotatable bearing ring 97 disposed about the follower nut. The two bearing rings 80 and 97 are separated by a plurality of ball bearings 100 which have the opposite portions received in the annular facing arcuate recesses 102 and 103 of the bearing rings. The provision of the ball bearings reduces the friction between the two bearing rings since the bearing ring 97 rotates with the drive screw due to the frictional engagement of the spring with the bearing ring and the retainer ring 91. The bearing ring 97 has a longitudinally extending flange 106 which extends into the central bore 107 of the other bearing ring 80.

In use, when it is desired to operate the brake pedal 11, which controls the braking system of the towed vehicle to brake the towed vehicle, the operator arm 32 of the control device 14 is moved to cause the contact 22 to engage the resistance 23. The degree of energization of the motor and therefore the force with which the drive shaft rotates the drive screw varies with the amount of resistance 23 connected in series in the circuit of the motor. When the motor is energized, it rotates the screw in such direction that the follower nut 52, which is now held against rotation by the force of the spring 90 due to the frictional engagement of the friction ring 84 with the facing surfaces 81 and 87 of the stationary ring and the flange 93, respectively, of the follower nut, moves downwardly on the drive screw. The stationary ring moves downwardly on the drive screw with the follower nut since the force exerted thereon by biasing spring 90 is sufficient to overcome the force of the spring 75 which tends to hold it against downward movement. As the stationary ring moves downwardly, it moves the brake pedal downwardly and the braking system of the towed vehicle applies a braking force to the wheels thereof in the usual well known manner. Should the force with which the brake pedal is depressed by the brake control apparatus tend to increase toward a valve at which the brake system of the towed vehicle would lock or apply an excessive dangerous force to the brakes, the friction between the coengageable side surfaces of the friction ring with one or both of the surfaces 81 and 87 of the bearing ring 80 and the follower nut flange, respectively, which has held the follower nut against rotation relative to the stationary ring, is overcome as the resistance to downward movement of the brake pedal increases with its downward movement and tends to hold the non-rotatable ring against further downward movement on the drive shaft. The downward biasing force of the spring 90 which has caused the non-rotatable ring to move downwardly with the follower nut is now partly counterbalanced. The follower nut now rotates with the drive screw and does not move downwardly thereon. In this manner the overload release means 58 prevents an excessive force from being applied to the braking pedal.

When it is desired to stop the braking of the towed vehicle, the operator arm 32 of the control device 14 in the towing vehicle is moved back to its original position wherein the contact 22 is in its open position to de-energize the motor 12. The combined force of the spring 75 and of the usual conventional means of the towed vehicle by means of which the brake pedal is biased upwardly, is now effective to move the non-rotatable ring and the follower nut upwardly on the drive shaft. This upward force is exerted on the follower nut through the bearing ring 80 of the non-rotatable ring, the ball bearings 100, the bearing ring 97, the spring 90, the retainer ring 91 and the lock ring 92. During such upward movement of the follwer nut, the drive shaft of the motor and the drive screw are rotated by this upward force which is transmitted to the drive screw by the follower nut.

Figure 7:
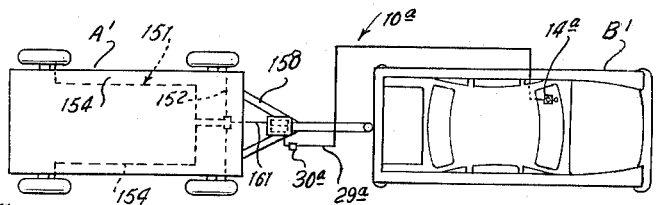
FIGURE 7 is a top schematic view of a towing vehicle and a towed vehicle having a hydraulic braking system which includes a master cylinder and illustrating the manner in which the brake control apparatus embodying the invention is connected to the master cylinder for operating the braking system of the towed vehicle from the towing vehicle.
Figure 8:
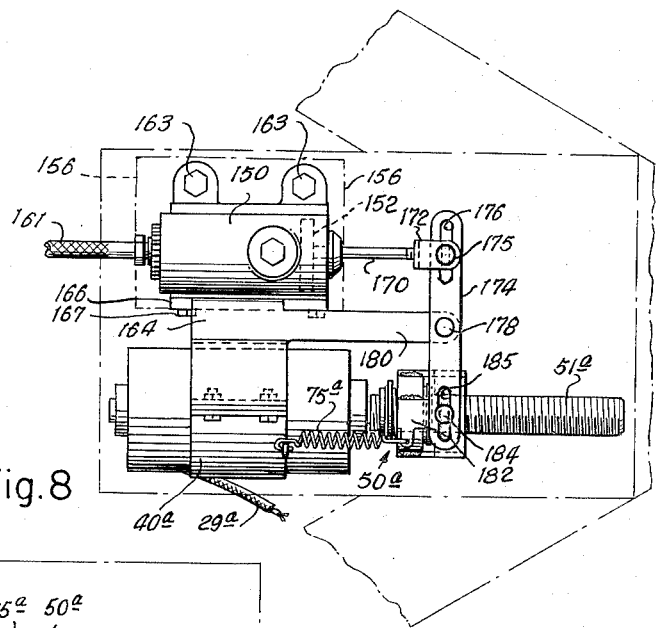
FIGURE 8 is an enlarged top view of the master cylinder of the towed vehicle showing the manner in which the motor of the brake control apparatus is connected to the piston of the master cylinder; and, FIGURE 9 is a side view taken on line 9—9 of FIGURE 8.
Figure 9:
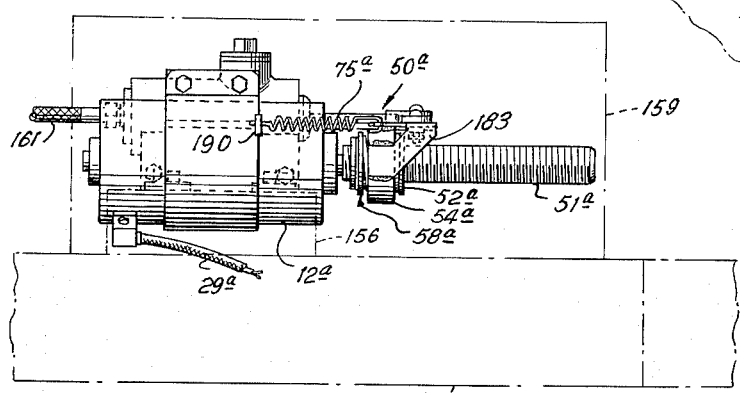

Referring now to FIGURES 7, 8 and 9 of the drawing, the brake control apparatus 10a embodying the invention for controlling the operation of the master cylinder 150 of the hydraulic braking system 151 of a towed vehicle A1 from a towing vehicle B1 is substantially similar to the brake control apparatus 10, and, accordingly, the elements of the brake control system 10a have been provided with the same reference numerals, to which the subscript "a" has been added, as the corresponding elements of the brake control system 10. The master cylinder 150 when its piston 152 is moved inwardly transmits a force through the hydraulic fluid in the hydraulic lines 154 to the individual brakes of the wheels of the towed vehicle. The master cylinder, the motor 12a and the connector means 50a are mounted on a suitable block 156 rigidly secured in any suitable manner on the draw bar 158 of the towed vehicle. A suitable removable housing 159 encloses this assembly and has appropriate apertures through which the main hydraulic line 161 from the master cylinder and the cable 29a from the motor may extend. The master cylinder is rigidly secured to the block or platform by suitable bolts 163. The motor mount band 40a has a horizontal plate 164 secured thereto, as by welding. The plate has a downwardly extending flange 166 rigidly secured thereto by the bolts 167.

The rod 170 of the piston has a bifurcated bracket 172 connected to its outer end between whose arm is movably disposed one end of a lever 174 connected for movement relative to the bifurcated bracket by a bolt 175 which extends through the suitable apertures in the arms of the bracket and an elongate slot 176 in the lever. The lever is pivotally secured intermediate its ends by a pivot bolt 178 to the forwardly extending arm 180 of the plate 164. The other end of the lever 174 is pivotally connected to a plate 182 of a bracket 183 by a pivot bolt 184 which extends through an elongate slot 185 of the lever arm and a suitable aperture in the plate 182. The bracket is rigidly secured by welding to the non-rotatable ring 54a of the connector means 50a.

It will be apparent that when the control device 14a, located in any suitable location within easy reach of the driver of the towing vehicle B1, is actuated to energize the motor 12a, the drive screw 51a is rotated. The follower nut 52a is moved outwardly on the drive screw 51a and pivots the lever 174 in a counter clockwise direction, FIGURE 8, about the pivot bolt 178. Such counter clockwise pivotal movement of the lever moves the piston inwardly to exert a force on the hydraulic fluid in the master cylinder to force it through the main line 166 and the hydraulic lines 154 to the brakes of the towed vehicle to apply a braking force to its wheels. When the control device is again moved to the position wherein the motor is de-energized, the force of the spring 75a, which is connected to the top horizontal plate 182 and to an upstanding lug 190 of the motor mount band 40a, as well as the usual means in the individual brakes of the wheel of the towed vehicle which exert a force tending to move the hydraulic fluid back into the master cylinder, causes the stationary ring and the follower nut to move the piston back to the position where no braking force is being applied to the wheels. The drive screw 51a rotates to permit this rearward movement of the follower nut on the drive screw and the lever 174 is pivoted in a clockwise direction about the pivot bolt 178.

It will be apparent that the direct current motor 12 or 12a of the brake control systems may be of any suitable type, the speed of rotation and the torque of whose drive shaft may be varied by varying the current flow through the motor by any suitable means, such as the rheostat resistance of the control device 14.

It will further be seen that the brake control apparatus 10a, like the brake apparatus 10, has an overload release means 58a which prevents the application of an excessive braking force to the wheels of the towed vehicle which might cause the brakes of the towed vehicle to lock the wheels.

It will now be seen that the new and improved brake control apparatus for controlling the braking system of a towed vehicle from the towing vehicle has been illustrated and described which is easily connectable in the case of the apparatus 10 on the steering column of a vehicle and to the brake pedal 11 thereof, and in the case of the brake control system 10a on the draw bar of a towed vehicle.

The foregoing description of the invention is explanatory only, and changes in the details of the method described and construction illustrated may be made by those skilled in the art, within the scope of the appended claims, without departing from the spirit of the invention.

What is claimed and desired to be secured by Letters Patent is:

1. In combination with a power driven towing vehicle having a battery and a towed vehicle having a brake system including an operator member movable in one direction to actuate the brake system, said brake control apparatus comprising an electric motor carried by said towed vehicle; control means mounted in the towing vehicle for connecting said electric motor in circuit with the battery of the towing vehicle, said electric motor having a rotatable shaft; connector means engageable with said drive shaft of said motor and the operator member of said brake system, said connector means including a drive screw connected to the shaft of said motor for rotation by said motor; and overload release means including a follower nut threaded on said drive screw, means connecting said folower nut to said brake operator means of said towed vehicle, said connecting means moving said operator member in said one direction when said overload release means holds said follower nut against rotation with said drive screw, said overload release means permitting rotation of said follower nut with said drive screw when the resistance of the operator member to movement in said one direction exceeds a predetermined value.

2. The brake control of claim 1 wherein said connecting means includes a non-rotatable member connected to said operator member of said brake system; friction means between and engageable with said non-rotatable member and said follower nut; means engaged with said non-rotatable member and said follower nut biasing said non-rotatable member toward said friction means and for movement with said follower nut in said one direction, said friction permitting rotation of said follower nut with said drive screw and relative to said non-rotatable member when the resistance of the operator member toward movement in said one direction exceeds said predetermined value, whereby the force exertable on said operator member by said motor to cause actuation of said brake system is limited.

3. The brake control apparatus of claim 2 wherein the operator member of the brake system of the towed vehicle includes a brake pedal, said motor being ridigdly securable to said towed vehicle adjacent the brake pedal.

4. The brake control apparatus of claim 2 when the brake system of the towed vehicle includes a hydraulic master cylinder and said operator member being a piston movable in the master cylinder, actuated by the brake system, said non-rotatable member being connectable to said piston.

5. A brake control apparatus for moving an operator member of a vehicle brake system in one direction including: an electric motor; control means for connecting said motor to a source of electric current; a drive screw rotatable by said electric motor; a follower nut threaded on said drive screw; a non-rotatable member disposed about said drive screw for movement longitdudinally of said drive screw; friction means disposed about said drive screw and between and engaging said non-rotatable member and said follower nut; means disposed about said drive screw engaging said follower nut and said non-rotatable member and biasing said non-rotatable member in said one direction relative to the follower nut and toward said friction means, said last mentioned means limiting movement of said non-rotatable member in a second direction opposite said one direction relative to said follower nut; and means for connecting said non-rotatable member to the operator member.

6. The brake control apparatus for moving an operator member of a vehicle brake system in one direction including: an electric motor; control means for connecting said motor to a source of electric current; a drive screw rotatable by said electric motor; a follower nut threaded on said drive screw; a non-rotatable member disposed about said drive screw for movement longitudinally of said drive screw; friction means disposed about said drive screw and between and engaging said non-rotatable member and said follower nut; means disposed about said drive screw engaging said follower nut and said non-rotatable member and biasing said non-rotatable member in said one direction relative to the follower nut and toward said friction means, said last mentioned means limiting movement of said non-rotatable member in a second direction opposite said one direction relative to said follower nut; means for connecting said non-rotatable member to the operator member; and means biasing said non-rotatable member in said second direction relative to said drive screw.

7. The brake control apparatus of claim 6, wherein said means for biasing said non-rotatable member in said one direction comprises a bearing ring disposed about said follower nut for rotation about the longitudinal axis of said drive screw, a spring disposed about said follower nut and engageable with said bearing ring for biasing said bearing ring in said one direction; and friction reducing means engaging said bearing ring and said non-rotatable means.

References Cited by the Examiner

UNITED STATES PATENTS

| | | | |
|---|---|---|---|
| 1,513,586 | 10/24 | Davis | 188—162 |
| 1,928,750 | 10/33 | Apple et al. | 188—163 X |
| 1,998,918 | 4/35 | Apple et al. | 188—156 |
| 2,207,228 | 7/40 | Seppmann | 188—3 |

ARTHUR L. LA POINT, *Primary Examiner.*

DUANE A. REGER, *Examiner.*